United States Patent
Yao et al.

(10) Patent No.: US 9,618,782 B2
(45) Date of Patent: Apr. 11, 2017

(54) TOUCH SENSOR, IN-CELL TOUCH LIQUID CRYSTAL DISPLAY PANEL AND LIQUID CRYSTAL DISPLAY

(71) Applicant: Shanghai Tianma Micro-Electronics Co., Ltd., Shanghai (CN)

(72) Inventors: Qijun Yao, Shanghai (CN); Lihua Wang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 241 days.

(21) Appl. No.: 14/050,186

(22) Filed: Oct. 9, 2013

(65) Prior Publication Data

US 2014/0049704 A1 Feb. 20, 2014

Related U.S. Application Data

(63) Continuation of application No. PCT/CN2012/085853, filed on Dec. 4, 2012.

(30) Foreign Application Priority Data

Aug. 17, 2012 (CN) .......................... 2012 1 0293260

(51) Int. Cl.
*G02F 1/1335* (2006.01)
*G02F 1/1333* (2006.01)
(Continued)

(52) U.S. Cl.
CPC .......... *G02F 1/13338* (2013.01); *G06F 3/044* (2013.01); *G06F 3/0412* (2013.01); *G06F 2203/04111* (2013.01)

(58) Field of Classification Search
CPC .... G02F 1/13338; G06F 3/044; G06F 3/0412; G06F 2203/04111
(Continued)

(56) References Cited

U.S. PATENT DOCUMENTS

2008/0245582 A1 10/2008 Bytheway
2010/0066650 A1* 3/2010 Lee et al. ........................ 345/64
(Continued)

FOREIGN PATENT DOCUMENTS

CN 101788875 A 7/2010
CN 101943975 A 1/2011
(Continued)

OTHER PUBLICATIONS

Office Action as issued in corresponding Korean Application No. 10-2013-7030599, dated Oct. 31, 2015.
(Continued)

*Primary Examiner* — Nathaniel R Briggs
*Assistant Examiner* — William Peterson
(74) *Attorney, Agent, or Firm* — Alston & Bird LLP (57) ABSTRACT

The invention relates to a touch sensor, an in-cell touch liquid crystal display panel and a liquid crystal display. The touch sensor includes a plurality of drive electrodes and a plurality of sense electrodes disposed in a same layer and intersecting each other. The drive electrodes occupy a first area and the sense electrodes occupy a second area different from the first area. Mutual capacitances are formed between the drive electrodes and the sense electrodes. The touch sensor further includes a plurality of virtual electrodes disposed in a third area that does not overlap the first and second areas.

14 Claims, 6 Drawing Sheets

(51) Int. Cl.
*G06F 3/044* (2006.01)
*G06F 3/041* (2006.01)

(58) Field of Classification Search
USPC .............................................. 349/12; 345/174
See application file for complete search history.

(56) References Cited

U.S. PATENT DOCUMENTS

2010/0214247 A1* 8/2010 Tang ........................ G06F 3/044
345/173
2011/0007030 A1* 1/2011 Mo et al. ....................... 345/174

FOREIGN PATENT DOCUMENTS

| CN | 101984391 A | 3/2011 |
| CN | 102200866 A | 9/2011 |
| CN | 102449581 A | 5/2012 |
| JP | 2011113504 A | 6/2011 |
| KR | 20100080469 A | 7/2016 |

OTHER PUBLICATIONS

Office Action as issued in corresponding Chinese Application 201210293260.3, dated Jul. 3, 2015.

* cited by examiner

TOUCH SENSOR, IN-CELL TOUCH LIQUID CRYSTAL DISPLAY PANEL AND LIQUID CRYSTAL DISPLAY

CROSS-REFERENCES TO RELATED APPLICATIONS

This application claims priority to and is a continuation of PCT/CN2012/085853, filed on Dec. 4, 2012 and entitled "TOUCH SENSOR, IN-CELL TOUCH LIQUID CRYSTAL DISPLAY PANEL AND LIQUID CRYSTAL DISPLAY", which application claims the benefit of Chinese Patent Application No. 201210293260.3, filed with the Chinese Patent Office on Aug. 17, 2012 and entitled "TOUCH SENSOR, IN-CELL TOUCH LIQUID CRYSTAL DISPLAY PANEL AND LIQUID CRYSTAL DISPLAY", the contents of which are incorporated herein by reference in their entirety.

FIELD OF THE INVENTION

The present invention relates to liquid crystal display technologies, and more particularly to a touch sensor, in-cell touch liquid crystal display panel and liquid crystal display.

BACKGROUND OF THE INVENTION

Various touch screens are used in a variety of electronic products, such as mobile phones, tablet computers, music players, etc. As a graphical user interface device, the touch screens include resistive type, capacitive type, surface acoustic wave type, infrared type and other types. Among different touch screen technologies, the capacitive touch screen has the advantages of a longer lifetime, higher transmissivity, a multi-point touch support, etc., as compared with the resistive touch screen. Mutual capacitance touch sensing is emerging as a technology for the capacitive touch screen, and has good suppression of noise and of parasitic capacitance to ground, and can provide a multi-point touch surface. Thus, the mutual capacitance touch sensing device is becoming a main thrust for various manufacturers of capacitive touch screen chips.

Figure 1:
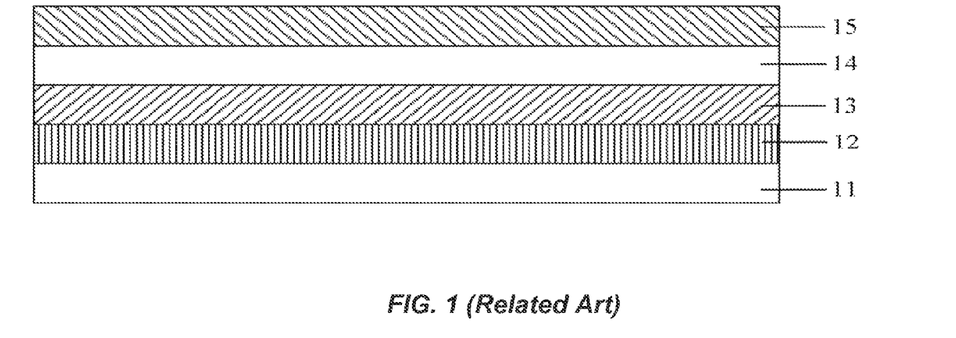
FIG. 1 is a schematic sectional structural view of a liquid crystal display panel of an in-cell mutual capacitance touch screen in the related art.

FIG. 1 illustrates a schematic sectional structural view of a liquid crystal display panel of an existing in-cell mutual capacitance touch screen. Refer to FIG. 1, the liquid crystal display panel includes an array substrate 11 and a color filter substrate 13 which are opposed each other. The array substrate 11 includes an array of Thin Film Transistors (TFTs) and an array of pixel electrodes. The liquid crystal display panel further includes a liquid crystal layer 12 disposed between the array substrate 11 and the color filter substrate 13; a touch sense electrode structure 14 formed on the color filter substrate 13. The touch sense electrode structure 14 includes a matrix structure formed of a plurality of drive electrodes and a plurality of sense electrodes which intersect each other, and mutual capacitances are formed between the drive electrodes and the sense electrodes. The liquid crystal display panel also includes a black matrix 15 formed on the touch sense electrode structure 14. Moreover, different types of crystal liquid display panels are somewhat different in structure, for example, for an In-Plane-Switching (IPS)-type liquid crystal panel or a Fringe Field Switching (FFS)-type liquid crystal panel, common electrodes are disposed in the layer 11 of the array of TFTs and the array of pixel electrodes; and for a Twisted Nematic (TN)-type liquid crystal panel or a Vertical Alignment (VA)-type liquid crystal panel, common electrodes are a part of the color filter substrate 13. In a practical application, a glass substrate (not illustrated in FIG. 1) is formed respectively on the outside of the layer 11 of the array of TFTs and the array of pixel electrodes and of the black matrix 15. In a conventional in-cell mutual capacitance touch screen, in order to lower parasitic capacitances between the drive electrodes or sense electrodes and the other electrodes in the liquid crystal panel, the area of the drive electrodes and the sense electrodes is reduced as much as possible, therefore, a blank area is left in the touch sense electrode structure 14 other than the drive electrodes and the sense electrodes, thus resulting in a non-uniform transmissivity distribution across the liquid crystal display panel and degrading the display performance.

Moreover since the drive electrodes and the sense electrodes in the in-cell mutual capacitance touch screen are at a very short distance from the other electrodes, e.g., pixel electrodes, common electrodes, etc., of the liquid crystal display than the drive electrodes and the sense electrodes, there are parasitic capacitances between the drive electrodes in the in-cell mutual capacitance touch screen and the other electrodes (e.g., the common electrodes), and between the sense electrodes in the in-cell mutual capacitance touch screen and the other electrodes (e.g., the common electrodes).

Figure 2:
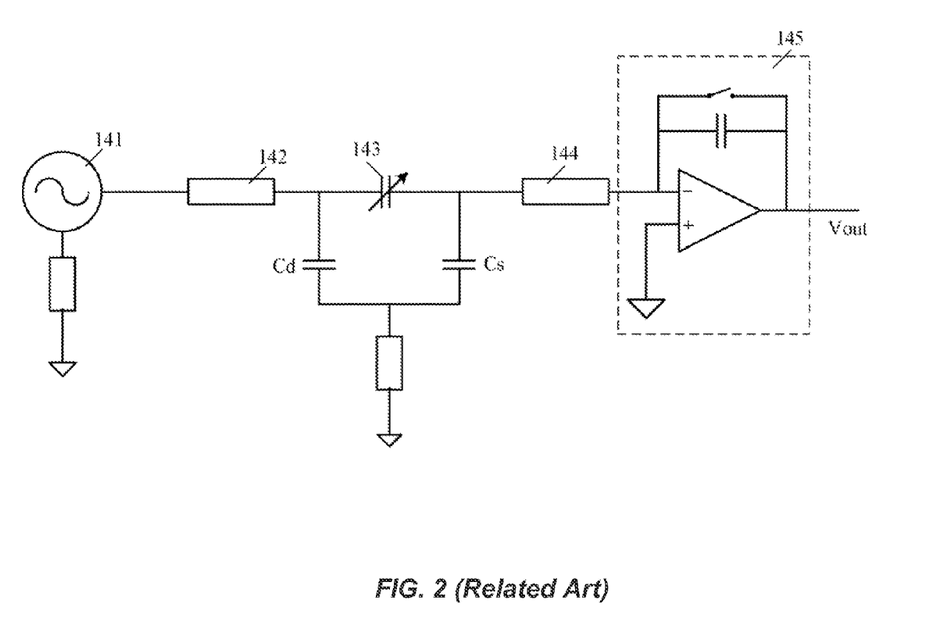
FIG. 2 is a schematic diagram of an equivalent circuit of the in-cell mutual capacitance touch screen in the related art.

FIG. 2 illustrates a schematic diagram of an equivalent circuit of the in-cell mutual capacitance touch screen. Referring to FIG. 2, the equivalent circuit includes a signal source 141, a drive electrode resistance 142, a mutual capacitance 143 between a drive electrode and a sense electrode, a sense electrode resistance 144 and a detection circuit 145. There is a parasitic capacitance Cd between the drive electrode and a common electrode, and there is a parasitic capacitance Cs between the sense electrode and the common electrode, and thus noise is introduced to the liquid crystal display panel. This noise is generally generated by: 1) a part of signal current input by a drive line is bypassed by Cd, and the other part thereof is coupled to a signal receiver through Cs, and capacitance values of Cd and Cs change frequently due to overturn of liquid crystal molecules in a liquid crystal layer, so does a coupled signal, and thereby generating noise; 2) the common electrode is typically of the indium tin oxide (ITO) material which has a large resistance, and inherent noise on the common electrode is coupled directly to the signal receiver through Cs. The presence of noise affects the detection of a sense signal of the touch screen, that is, the liquid crystal display panel cannot detect accurately a touch by a finger of a user and consequently cannot respond to the touch by the finger in a timely manner.

BRIEF SUMMARY OF THE INVENTION

Embodiments of the present invention provide a liquid crystal display panel with an in-cell mutual capacitance touch screen having better transmissivity and higher screen brightness.

In order to address the foregoing problems, a touch sensor according to the present invention includes: a plurality of drive electrodes and a plurality of sense electrodes intersecting each other and having mutual capacitances formed between them; wherein a plurality of virtual electrodes are further disposed in the remaining area other than the drive electrodes and the sense electrodes, and the virtual electrodes are located in the same layer as the drive electrodes and the sense electrodes.

An embodiment of the invention further provides an in-cell touch liquid crystal display panel including a first substrate and an array substrate disposed in opposition to each other, and a liquid crystal layer disposed between the first substrate and the array substrate, wherein the first substrate includes a first transparent substrate, a black matrix, the touch sensor and a color filter layer.

An embodiment of the invention also provides a liquid crystal display including the foregoing in-cell touch liquid crystal display panel.

The present invention provides technical solutions that have many advantages and benefits over the related art. Because the plurality of virtual electrodes is disposed in the area of the touch sensor other than the areas occupied by the drive electrodes and the sense electrodes to thereby fill the existing blank area, the transmissivity of the liquid crystal display panel can be distributed uniformly for a better display effect. And because the plurality of virtual electrodes is located in the same layer as the drive electrodes and the sense electrodes, the entire liquid crystal panel can have a better transmissivity and a higher screen brightness. Because parasitic capacitances between the touch sensor and the array substrate are reduced, sufficiently large mutual capacitances can be obtained for detection of a touch sense signal while electrostatic effects caused by a touch of the liquid crystal display panel by an object (e.g., a finger) are eliminated.

DETAILED DESCRIPTION OF THE INVENTION

Embodiments of the present invention provide a liquid crystal display panel with an in-cell mutual capacitance touch screen having better transmissivity and higher screen brightness, and having a sufficiently large mutual capacitance for easy detection of a touch sense signal while reducing parasitic capacitances between the touch sensor and other electrodes in the liquid crystal panel than drive electrodes and sense electrodes. Embodiments of the present invention also remove electrostatic effects arising when the liquid crystal display panel is touched by a finger.

Preferred embodiments of the invention will be described below in details with reference to the drawings in order to make the foregoing objects, features and advantages of the invention more apparent.

Particular details will be set forth in the following description for full understanding of the invention. However the invention can be embodied in numerous different implementations from those described here, and those skilled in the art can make various modifications without departing from the spirit of the invention. Accordingly, the invention is not limited to the following specific embodiments as described below.

Figure 3A:
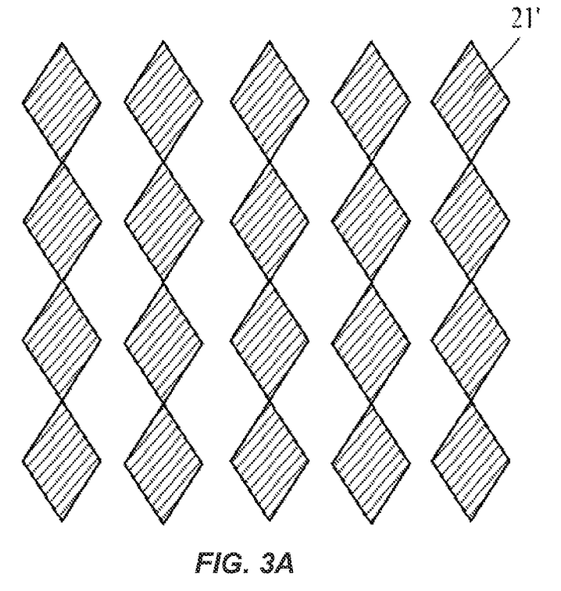
FIG. 3A is a schematic structural diagram of a pattern of a drive electrode in a touch sensor according to an embodiment of the invention.
Figure 3B:
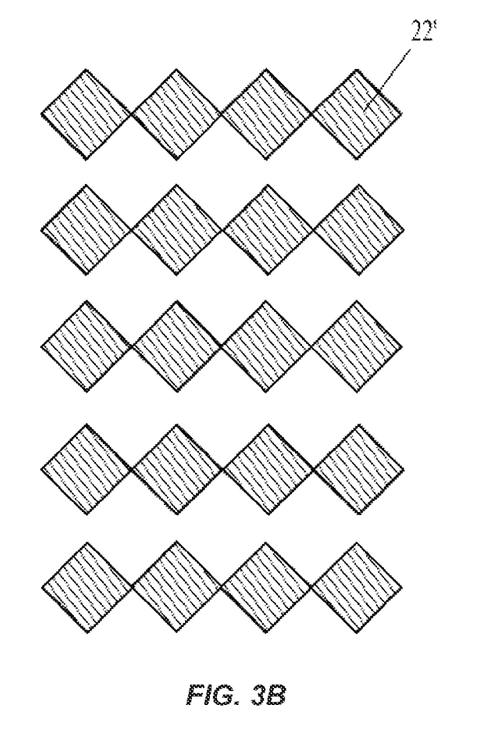
FIG. 3B is a schematic structural diagram of a pattern of a sense electrode in a touch sensor according to an embodiment of the invention.

FIG. 3A illustrates a schematic structural diagram of a pattern of a drive electrode in a touch sensor. Referring to FIG. 3A, the touch sensor includes a plurality of parallel drive electrodes 21' structured in a diamond pattern. FIG. 3B illustrates a schematic structural diagram of a pattern of a sense electrode in the touch sensor. Referring to FIG. 3B, the touch sensor includes a plurality of parallel sense electrodes 22' structured in a diamond pattern. It shall be noted that in a practical application, the pattern structures of the drive electrode and the sense electrode can alternatively have other regular or irregular patterns, such as a rectangular shaped pattern, a strip-like shaped pattern, etc., and the pattern structures of the drive electrode and the sense electrode can alternatively be different patterns, for example, the pattern structure of the drive electrode is of a rectangle pattern, and the pattern structure of the sense electrode is of a strip-like shaped pattern.

Figure 3C:
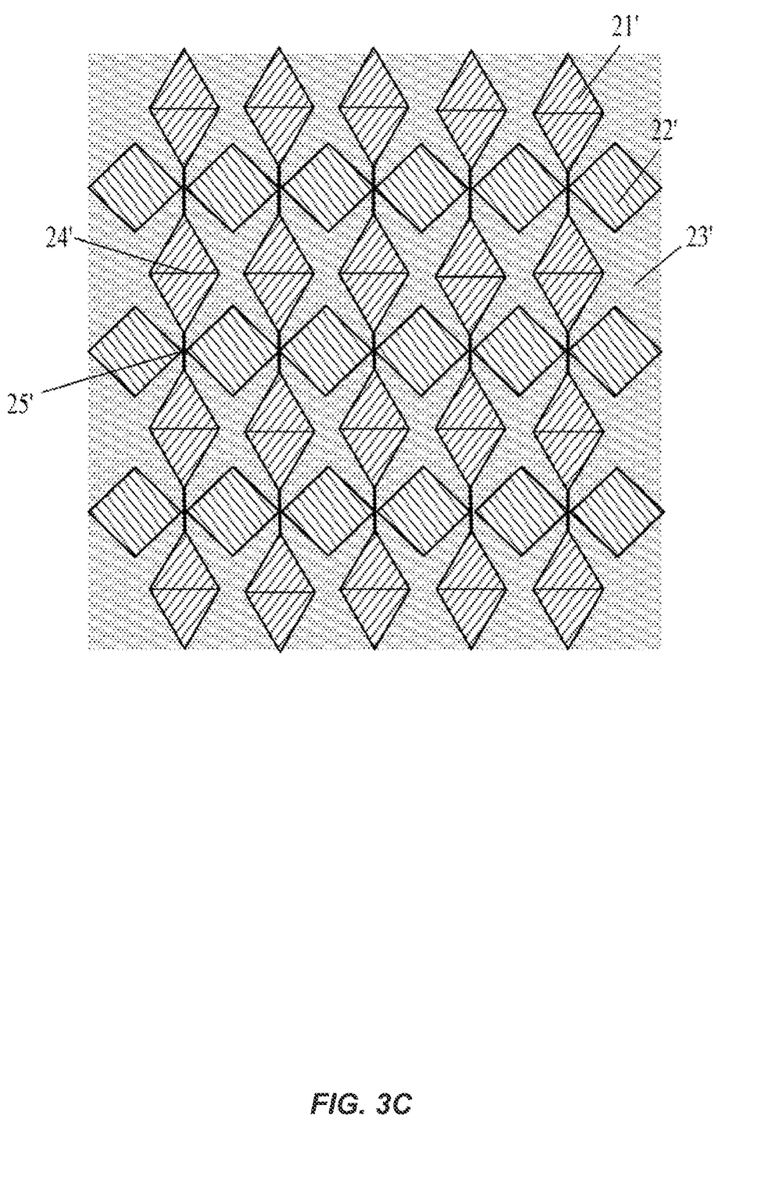
FIG. 3C is a top view of a touch sensor including drive electrodes and sense electrodes according to an embodiment of the invention.
Figure 3D:
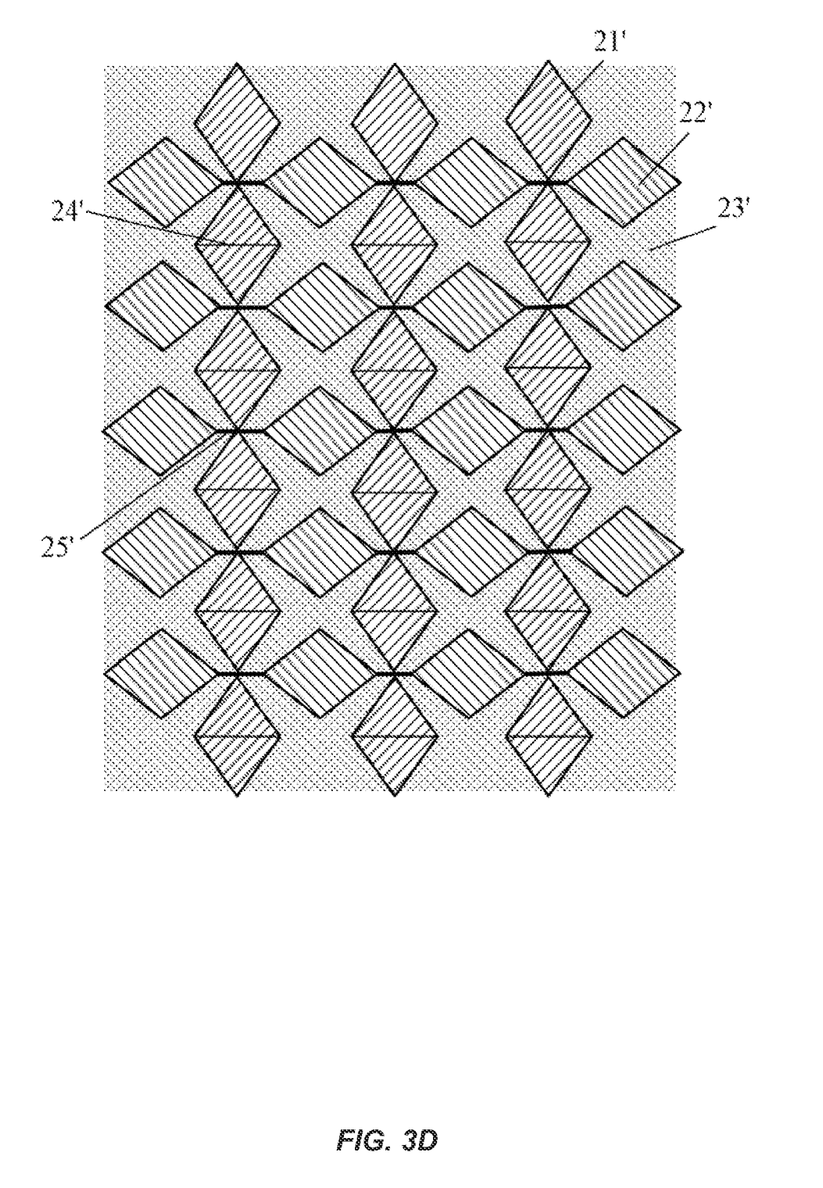
FIG. 3D is a top view of another touch sensor including drive electrodes and sense electrodes according to an embodiment of the invention.

In an embodiment of the invention, the plurality of drive electrodes and the plurality of sense electrodes intersect each other, and the drive electrodes and the sense electrodes are located in the same layer, so that each drive electrode (or sense electrode) will be segmented (separated) by the plurality of sense electrodes (or drive electrodes) into a plurality of discontinuous segments. Referring to FIG. 3C, each drive electrode 21' is segmented by the plurality of sense electrodes 22' into a plurality of discontinuous segments, and in this case, the plurality of segments of the same drive electrode will be electrically interconnected by bridges (as illustrated by the bold line segments 25' in FIG. 3C), and the respective sense electrodes 22' each are still a continuous and intact strip. Referring to FIG. 3D, each sense electrode 22' is segmented (separated) by the plurality of drive electrodes 21' into a plurality of discontinuous segments, and in this case, the plurality of segments of the same sense electrode will be electrically interconnected by bridges (as illustrated by the bold line segments 25' in FIG. 3D), and the respective drive electrodes 21' each are still a continuous and intact strip.

In the two touch sensors including the drive electrodes and the sense electrodes as illustrated in FIG. 3C and FIG. 3D, there are mutual capacitance formed between the plurality of drive electrodes 21' and the plurality of sense electrodes 22', and in the layer where the drive electrodes 21' and the sense electrodes 22' are located, there is a blank area other than the area occupied by the plurality of drive electrodes 21' and the plurality of sense electrodes 22'. In an embodiment of the invention, virtual electrodes are disposed in the blank area 23', and adjacent virtual electrodes are electrically connected by bridges (as illustrated by the thin line segments 24' in FIG. 3C and FIG. 3D) in the direction parallel to the drive electrodes or preferably parallel to the sense electrodes 22'. Preferably, the virtual electrodes fill throughout the blank area 23' to thereby compensate for the difference in transmissivity between the blank area without electrodes in the existing touch sensor and the area where the drive electrodes and the sense electrodes are located so as to make transmissivity distributed uniformly and consequently have a uniform display on a screen of a manufactured liquid crystal display.

The touch sensor according to the invention will be described below in a particular embodiment.

Figure 4:
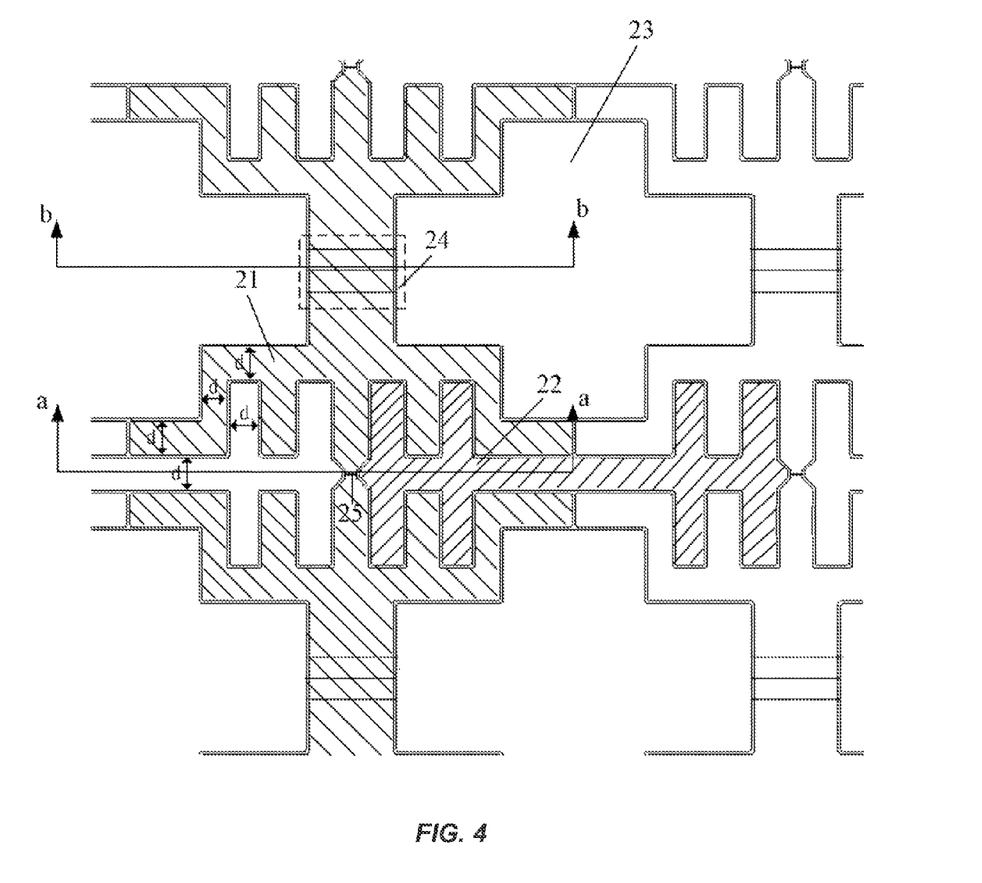
FIG. 4 is a schematic diagram of a partial structure of a touch sensor according to an embodiment of the invention.

FIG. 4 is a schematic diagram of a partial structure of a specific embodiment of a touch sensor according to the invention. In this embodiment, the drive electrodes 21 and the sense electrodes 22 respectively have a first pattern structure and a second pattern structure that are complementary to each other. In a referred embodiment, as illustrated in FIG. 4, the first pattern structure and the second pattern structure are both of branch shapes that are complementary to each other. For example, each of the drive electrodes 21 has the first pattern structure having a first set of branches, and each of the sense electrodes 22 has the second pattern structure having a second set of branches, and the sets of branches of the two pattern structures (the sections with an identified width d as illustrated in FIG. 4) can be inlayed to form an interlocked structure, i.e., the two sets of branches are complementary to each other.

Figure 4A:
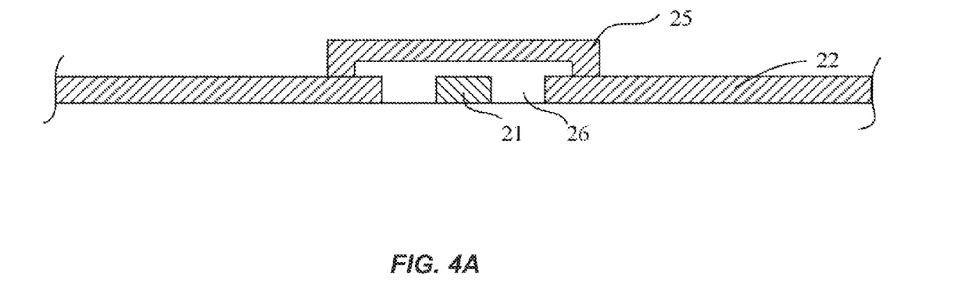
FIG. 4A is a schematic sectional view of the partial structure of the touch sensor illustrated in FIG. 4 along the line a-a.

Referring to FIG. 4, the touch sensor includes a plurality of drive electrodes 21 and a plurality of sense nodes 22 which intersect each other, and in this embodiment, a plurality of segments into which each sense electrode 22 is segmented by the plurality of drive electrodes 21 are connected by bridges. Specifically, when each sense electrode 22 is segmented by the plurality of drive electrodes 21 into a plurality of segments, the touch sensor further includes first bridges 25, and the plurality of segments of the same sense electrode 22 are electrically connected by the first bridges 25, and also an insulation layer needs to be disposed on the layer where the drive electrodes or the sense electrodes are located to ensure insulation between the first bridges 25 and the drive electrodes 21. Specifically, FIG. 4A is a schematic sectional view of the partial structure of the touch sensor illustrated in FIG. 4 along the line a-a. As illustrated in FIG. 4A, the sense electrode 22 is segmented by the drive electrode 21 into two segments which are electrically connected by the first bridge 25. Furthermore, an insulation layer 26 is disposed on the layer where the drive electrode 21 or the sense electrode 22 is located to ensure insulation between the first bridge 25 and the drive electrode 21.

According to an embodiment, the drive electrode 21 and the sense electrode 22 can be interchanged in location, that is, the sense electrodes 22 can be disposed at the locations where the drive electrodes 21 in FIG. 4 are located, and also the drive electrodes 21 can be disposed at the locations where the sense electrodes 22 are located. Thus, when each drive electrode 21 is segmented by the plurality of sense electrodes 22 into a plurality segments, the plurality of segments of the same drive electrode 21 are electrically connected by the first bridges 25, and also an insulation layer needs to be disposed on the layer where the drive electrodes or the sense electrodes are located to ensure insulation between the first bridges 25 and the sense electrodes 22. As can be apparent, actually the first bridges 25 are disposed at the locations where the plurality of drive electrodes 21 and the plurality of sense electrodes 22 intersect. In a practical application, it is not limited to the plurality of segments of drive electrode or the plurality of segments of sense electrode connected respectively by the bridges, and those skilled in the art can alternatively make use of other electrical connection means, a detailed description of which will be omitted here.

Unlike the related art, as illustrated in FIG. 4, a plurality of virtual electrodes 23 are further disposed in the remaining area of the touch sensor other than the drive electrodes 21 and the sense electrodes 22. In this embodiment, the plurality of drive electrodes 21 and the plurality of sense electrodes 22 are located in the same layer, and the remaining area refers to as all the other blank areas in the layer other than the areas occupied by the plurality of drive electrodes 21 and the plurality of sense electrodes 22. In this embodiment, as illustrated in FIG. 4, the remaining area includes a plurality of sub-blank areas surrounded by every two adjacent drive electrodes 21 in the horizontal direction, e.g., the areas occupied by the virtual electrodes 23. As can be appreciated, there are a plurality of such sub-blank areas throughout the layer where the drive electrodes and the sense electrodes are located. In another embodiment, since the drive electrodes and the sense electrodes can be interchanged in location, that is, the sense electrodes can be disposed at the locations where the drive electrodes 21 in FIG. 4 are located, and also the drive electrodes can be disposed at the locations where the sense electrodes 22 are located, the remaining area includes a plurality of sub-blank areas surrounded by every two adjacent sense electrodes in the horizontal direction. With the plurality of virtual electrodes disposed in the remaining area, the difference in transmissivity between the remaining area without electrodes in the existing touch sensor other than the area occupied by the drive electrodes and the sense electrodes and the area where the drive electrodes and the sense electrodes are located can be compensated for so as to have transmissivity distributed uniformly and consequently obtain a uniform display on a screen of a finally manufactured liquid crystal display. Furthermore, in this embodiment, since the virtual electrodes 23 are located in the same layer as the drive electrodes 21 and the sense electrodes 22, no additional layer needs to be further added to the touch sensor for purpose of arranging the virtual electrodes, thus avoiding the problem of reduced transmissivity due to an additional layer and consequently enabling the fabricated liquid crystal display panel to have better transmissivity and high screen brightness.

Since the virtual electrodes 23 are disposed in the touch sensor, the inventors have noticed that an overturn status of liquid crystal molecules in the liquid crystal layer may be changed when the virtual electrodes 23 are subject to electrostatic induction due to a touch by an object (e.g., a finger), thus degrading the display performance. In view of this observation, the inventors have connected virtual electrodes 23 at a ground potential or connected at a fixed potential to thereby eliminate an electrostatic effect. In a preferred embodiment, the value of the fixed potential ranges from about −20V to about +20V. In other words, the electrostatic effect can be eliminated when the value of the fixed potential is not below −20 V or above +20 V.

Figure 4B:
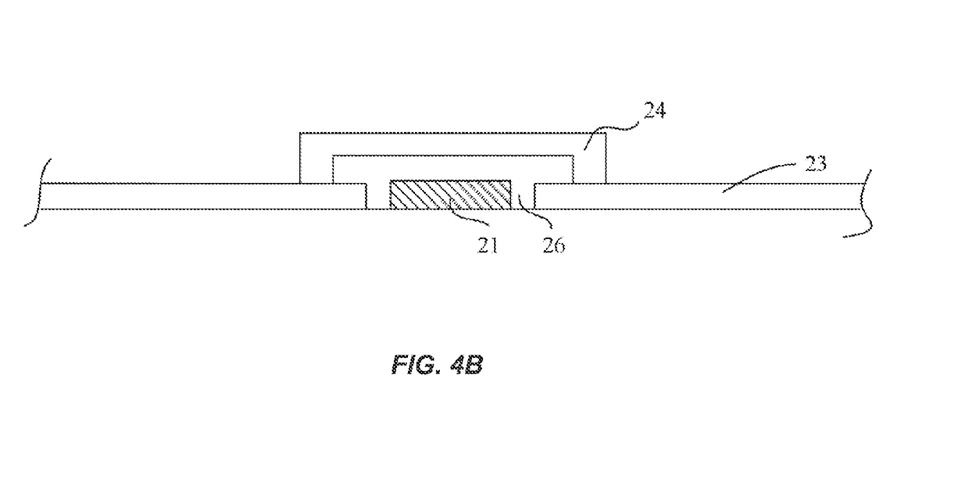
FIG. 4B is a schematic sectional view of the partial structure of the touch sensor illustrated in FIG. 4 along the line b-b.

In this embodiment, as illustrated in FIG. 4, the touch sensor further includes second bridges 24, and the adjacent virtual electrodes 23 are electrically connected preferably in the extending direction of the sense electrodes 22, by the second bridges 24 insulated from the drive electrodes 21 by the foregoing insulation layer. Specifically, reference is made to FIG. 4B illustrating a schematic sectional view of the partial structure of the touch sensor illustrated in FIG. 4 along the line b-b. As illustrated in FIG. 4B, adjacent virtual electrodes 23 are electrically connected in the extending direction of the sense electrodes, by the second bridges 24 insulated from the drive electrodes 21 by the foregoing insulation layer 26. It shall be noted that in a practical process, a unified insulation layer can alternatively be formed on the layer where the drive electrodes 21 and the sense electrodes 22 are located, and then punched into via holes at the locations where the sense electrodes or the drive electrodes need to be electrically connected, and the first bridges by which the sense electrodes or the drive electrodes are electrically connected can be formed through the via holes. Similarly, adjacent virtual electrodes can be electrically connected by the second bridges preferably in the extending direction of the sense electrodes. Preferably, the first bridges and the second bridges can be located in the same layer so that the number of process steps can be reduced and the efficiency of the manufacturing process can be improved.

According to a variation of this embodiment, the adjacent virtual electrodes 23 can also be electrically connected in the extending direction of the drive electrodes 21, by the second bridges 24 insulated from the drive electrodes 21 and the sense electrodes 22 through the foregoing insulation layer. In this embodiment, the drive electrodes 21 and the sense electrodes 22 can be interchanged in location in FIG. 4, that is, the sense electrodes can be disposed at the locations where the drive electrodes 21 in FIG. 4 are located, and the drive electrodes can be disposed at the locations where the sense electrodes 22 are located, and the virtual electrode 23 are unchanged in location. In this case, the virtual electrodes 23 are surrounded by the sense electrodes 22, and the adjacent virtual electrodes 23 are electrically connected in the extending direction of the drive electrodes or preferably in the extending direction of the sense electrodes, by the second bridges 24 insulated from the sensor electrodes or from the sense electrodes and the drive electrodes through the foregoing insulation layer.

In a specific embodiment, the insulation layer can be disposed between the layer where the drive electrodes and the sense electrodes are located and the color filter layer in the structure of a conventional liquid crystal display panel (not illustrated in FIG. 4). Alternatively, the insulation layer can be disposed between the layer where the drive electrodes and the sense electrodes are located and the black matrix (not illustrated in FIG. 4). In a practical case, it is not limited to the virtual electrodes connected by the bridges, and those skilled in the art can alternatively make use of other electrical connection means, e.g., circuits. It is to be understood that the invention is not limited to any particular circuit connection as long as there is electrical connectivity between the adjacent vertical electrodes, and a repeated description thereof will be omitted here. The second bridges 24 may function as a shield between the drive electrodes or the sense electrodes and the common electrodes (not illustrated in FIG. 4) and cut off parasitic loops between the drive electrodes or sense electrodes and the common electrodes, and alleviate noise arising from a change in current through the parasitic loops due to overturn of liquid crystal molecules in the liquid crystal layer.

Those skilled in the art shall appreciate that there are mutual capacitances between the intersecting drive electrodes 21 and sense electrodes 22, and the value of the mutual capacitances is proportional to the sizes of the areas of the drive electrodes and the sense electrodes, and proportional to the length of the matching edges where the drive electrodes and the sense electrodes intersect. Recalling the problem in the related art, since the larger the drive electrodes and the sense electrodes have in an area, the larger the parasitic capacitances will be generated. Thus, the effect of the parasitic capacitances can be suppressed by reducing the areas of the drive electrodes and the sense electrodes, but this will also reduce the mutual capacitances to some extent and consequently make it difficult to detect a change in a touch signal. Then the inventors consider compensation for a reduction in mutual capacitance due to a reduction in area of the drive electrodes and the sense electrodes by increasing the effective length of the matching (complementary) edges where the drive electrodes and the sense electrodes intersect while reducing the areas thereof.

In an embodiment, the drive electrodes are designed to have a first pattern structure, and the sense electrodes are designed to have a second pattern structure that has a substantially complementary shape with the first pattern structure. The areas of both the drive electrodes and the sense electrodes can be reduced by having an interlocking (complementary) peripheral pattern of the drive electrodes and the sense electrodes where the electrodes intersect each other. With the electrodes having a set of parallel branches, the effective length of the interlocked edges where the drive electrodes and the sense electrodes intersect can be increased while the areas of the drive electrodes and the sense electrodes can be reduced. The effective length of the matching (complementary or interlocked) edges will be larger with an increased number of branches in the set of branch shapes.

In a specific embodiment, in order to ensure the touch sensor to be capable of receiving a sufficiently strong touch signal, both the branches of the drive electrodes and the branch sections of the sense electrodes have a width greater than 0.2 mm, or either the branches of the drive electrodes or the branches of the sense electrodes have a width greater than 0.2 mm. Further referring to FIG. 4, the width "d" denotes the width of the branches of the drive electrodes or the sense electrodes. And in the areas of the first bridges 25 and the second regions 24, these areas are simply where the drive electrodes 21 and the sense electrodes 22 intersect and they do not affect the intensity of a received touch signal, so the bridges will not be required to be wider than 0.2 mm. It will be appreciated by those skilled in the art that the branches can be designed with different widths according to different requirements for the intensity of the received signal of the touch sensor without departing from the spirit and scope of the present invention.

It shall be noted that the branch shape of the drive electrodes 21 and the branch shape of the sense electrodes 22 as illustrated in FIG. 4 are merely illustrative and are not intended to geometrically limit the branch shapes. Furthermore, the first pattern structure and the second pattern structure will not be limited to branch shapes matching (complementary to) each other. They can also be other complementary shapes such as L-shaped pattern structures which are complementary to each other, and a detailed description thereof will be omitted herein.

In the touch sensor, parasitic capacitances between the sense electrodes and the other electrodes in the liquid crystal display panel than the drive electrodes and the sense electrodes will have a larger influence upon a signal of the touch sensor, so in this embodiment, preferably the area of the sense electrodes is smaller than that of the drive electrodes, and the virtual electrodes are surrounded by every two adjacent drive electrodes, and also the adjacent virtual electrodes are connected in the extending direction of the sense electrodes, by the bridges (as illustrated in FIG. 4). In another embodiment, since the drive electrodes 21 and the sense electrodes 22 can be interchanged in location, and the virtual electrodes 23 are unchanged in location, in this case, the virtual electrodes are surrounded by every two adjacent sense electrodes, and the adjacent virtual electrodes are connected preferably in the extending direction of the sense electrodes, by the bridges.

In this embodiment, the drive electrodes, the sense electrodes and the virtual electrodes can be made of indium tin oxide or the indium zinc oxide, but a practical application will not be limited thereto.

Figure 5:
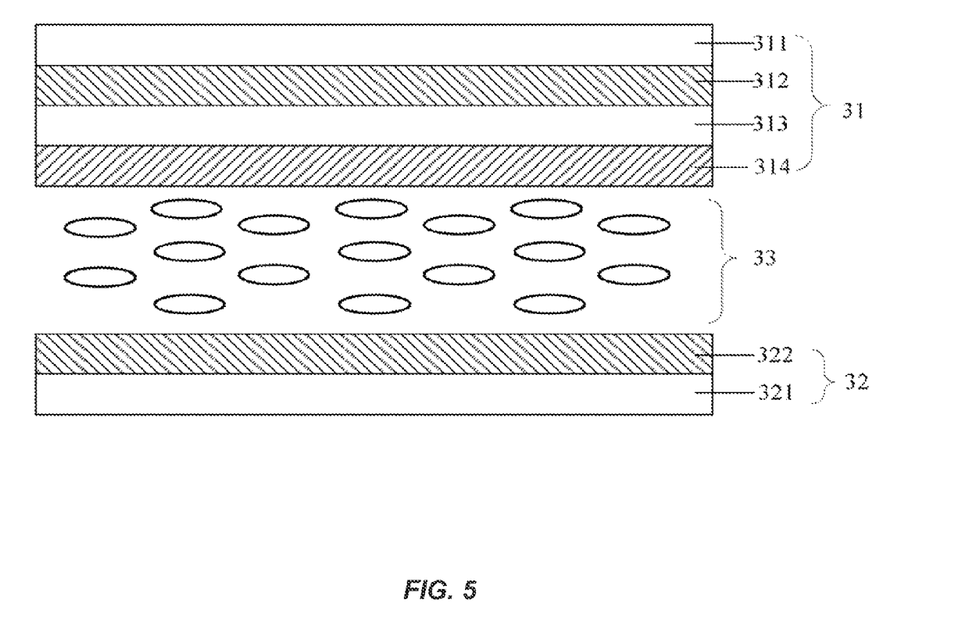
FIG. 5 is a schematic sectional structural view of an in-cell touch liquid crystal display panel according to an embodiment of the invention.

Based upon the foregoing touch sensor, an embodiment of the invention further provides an in-cell touch liquid crystal display panel without increasing the thickness and the weight of the entire display assembly as compared with an on-cell touch liquid crystal display panel. FIG. 5 illustrates a schematic structural view of an in-cell touch liquid crystal display panel according to an embodiment of the invention.

Referring to FIG. 5, the in-cell touch liquid crystal display panel includes a first substrate 31 and an array substrate 32 disposed in opposition to each other and a liquid crystal layer 33 disposed between the first substrate 31 and the array substrate 32, where the first substrate 31 includes, in sequential order towards the array substrate 32, a first transparent substrate 311, a black matrix 312, any one of the touch sensors 313 as described above, and a color filter layer 314 in the direction that the first substrate 31. Preferably, the black matrix 312, the touch sensor 313 and the color filter layer 314 are disposed sequentially on the surface of the first transparent substrate 311 facing the liquid crystal layer 33. The array substrate 32 includes, in sequential order, a second transparent substrate 321 and a TFT array and pixel array 322 in the direction that the array substrate 32 faces the first substrate 31. In another embodiment, the touch sensor 313 and the color filter layer 314 can be interchanged in location, that is, the touch sensor 313 can be disposed between the color filter layer 314 and the liquid crystal layer 33.

The foregoing in-cell touch liquid crystal display panel is primarily directed to the IPS-type liquid crystal panel or the FFS-type liquid crystal panel with the common electrodes (not illustrated in FIG. 5) disposed in the TFT array and pixel array 322, and for the TN-type liquid crystal panel or the VA-type liquid crystal panel, the in-cell touch liquid crystal display panel according to the invention further includes a common electrode layer. Specifically in another embodiment of the invention, the first substrate 31 further includes a common electrode layer (not illustrated in FIG. 5) on the surface of the color filter layer 314 facing the liquid crystal layer 33, that is, the common electrode layer is disposed on the surface of the color filter layer 314 facing the liquid crystal layer 33 to cooperate with the pixel electrodes on the array substrate 32 in providing the liquid crystal layer 33 with an electric field.

In an embodiment, in the touch sensor 313, the drive electrodes, the sense electrodes and the virtual electrodes can be of the same transparent electrically-conductive material, e.g., indium tin oxide or indium zinc oxide. In another embodiment, the drive electrodes, the sense electrodes and the virtual electrodes can be of a compound material of metal and the transparent electrically-conductive material, where the metal is disposed like a grid, and the metal grid is shielded by the black matrix. For example, the black matrix overlaps with the metal grid in the direction normal to the in-cell touch liquid crystal display panel so that the in-cell touch liquid crystal display panel appears still transparent as a whole.

The present invention further provides a liquid crystal display including the in-cell touch liquid crystal display panel according to any one of the foregoing embodiments of the invention.

In summary, the technical solutions of the invention have at least the following advantages and benefits. Since the plurality of virtual electrodes are disposed in the remaining area of the touch sensor other than the area occupied by the drive electrodes and the sense electrodes thereby filling the existing blank area, the transmissivity of the liquid crystal display panel can be distributed uniformly for a better display effect, and since the plurality of virtual electrodes are located in the same layer as the drive electrodes and the sense electrodes, the entire liquid crystal panel can have better transmissivity and higher screen brightness.

Furthermore, in the case where the disposed virtual electrodes are at a ground potential or connected at a fixed potential, an electrostatic effect due to a touch by a finger can be eliminated to thereby effectively prevent the virtual electrodes from subjecting to electrostatic induction from changing an overturn status of liquid crystal molecules in the liquid crystal layer.

Furthermore, in order to reduce the parasitic capacitances of the touch sensor while ensuring sufficiently large mutual capacitances thereof, in a particular embodiment, the drive electrodes and the sense electrodes can be designed in pattern structures matching each other in shape, and preferably the drive electrodes and the sense electrodes can be designed in branch shapes matching each other, so that together with a reduction in area of the drive electrodes and the sense electrodes to thereby suppress the parasitic capacitances, the structural feature of the branch shapes can have the length of the matching edges where the drive electrodes and the sense electrodes intersect increased, to thereby compensate for a reduction in mutual capacitance due to the reduction in area so as to make it easy to detect a touch sense signal.

Although preferred embodiments of the invention have been described, those skilled in the art benefiting from the underlying inventive concept can make additional modifications and variations to these embodiments. Therefore, the appended claims are intended to be construed as encompassing the preferred embodiments and all the modifications and variations coming into the scope of the invention.

Evidently those skilled in the art can make various modifications and variations to the invention without departing from the essential and scope of the invention. Thus, the invention is also intended to encompass these modifications and variations thereto as long as the modifications and variations come within the scope of the appended claims and their equivalents.

What is claimed is:

1. A touch sensor, comprising:
   a plurality of drive electrodes and a plurality of sense electrodes intersecting each other and having mutual capacitances formed among them;
   a plurality of dummy electrodes being disposed in a same layer as the drive electrodes and the sense electrodes, in a remaining area other than an area occupied by the drive electrodes and the sense electrodes, wherein each of the plurality of dummy electrodes is surrounded by either some of the plurality of drive electrodes or some of the plurality of sense electrodes but not by both;
   a plurality of first bridges and a plurality of second bridges located in a same layer wherein the plurality of dummy electrodes are electrically connected by the plurality of second bridges; and wherein the plurality of drive electrodes separates each of the sense electrodes into a plurality of segments, the plurality of segments of a same sense electrode being electrically connected by the plurality of first bridges, the first bridges being insulated from the drive electrodes through an insulation layer, and the second bridges being insulated from the drive electrodes through the insulation layer; or the plurality of sense electrodes separates each of the drive electrodes into a plurality of segments, the plurality of segments of a same drive electrode being electrically connected by the plurality of first bridges, the first bridges being insulated from the sense electrodes through an insulation layer, and the second bridges being insulated from the sense electrodes through the insulation layer.

2. The touch sensor according to claim 1, wherein the dummy electrodes are at a ground potential or at a fixed potential.

3. The touch sensor according to claim 1, wherein the drive electrodes have a first pattern structure, and the sense electrodes have a second pattern structure, the second pattern structure having a complementary shape to a shape of the first pattern structure.

4. The touch sensor according to claim 3, wherein the first pattern structure and the second pattern structure each comprise a plurality of branches.

5. The touch sensor according to claim 4, wherein the branches of the drive electrodes and/or of the sense electrodes have a width greater than 0.2 mm.

6. The touch sensor according to claim 1, wherein an area of the sense electrodes is smaller than an area of the drive electrodes.

7. The touch sensor according to claim 1, wherein the insulation layer is disposed between the layer of the drive electrodes and the sense electrodes and a color filter layer; or the insulation layer is disposed between the layer of the drive electrodes and the sense electrodes and a black matrix.

8. The touch sensor according to claim 2, wherein the fixed potential is in a range from about −20V to about +20V.

9. The touch sensor according to claim 1, wherein the dummy electrodes are made of indium tin oxide or indium zinc oxide.

10. An in-cell touch liquid crystal display panel, comprising:
a first substrate and an array substrate disposed in opposition to each other; and
a liquid crystal layer disposed between the first substrate and the array substrate;
wherein the first substrate comprises a first transparent substrate, a black matrix, a touch sensor, and a color filter layer,
wherein the touch sensor comprises a plurality of drive electrodes and a plurality of sense electrodes intersecting each other and having mutual capacitances formed between them,
wherein a plurality of dummy electrodes is disposed in a remaining area other than an area occupied by the drive electrodes and the sense electrodes, each of the dummy electrodes being surrounded by either a plurality of drive electrodes or a plurality of sense electrodes and wherein the dummy electrodes are located in a same layer as the drive electrodes and the sense electrodes;
wherein the touch sensor further comprises a plurality of first bridges and a plurality of second bridges located in a same layer, wherein the plurality of dummy electrodes are electrically connected by the plurality of second bridges; and
wherein the plurality of drive electrodes separates each of the sense electrodes into a plurality of segments, the plurality of segments of a same sense electrode being electrically connected by the plurality of first bridges, the first bridges being insulated from the drive electrodes through an insulation layer, and the second bridges being insulated from the drive electrodes through the insulation layer; or the plurality of sense electrodes separates each of the drive electrodes into a plurality of segments, the plurality of segments of a same drive electrode being electrically connected by the plurality of first bridges, the first bridges being insulated from the sense electrodes through an insulation layer, and the second bridges being insulated from the sense electrodes through the insulation layer.

11. The display panel according to claim 10, wherein the drive electrodes, the sense drive electrodes and the dummy drive electrodes comprise a compound structure composed of a metal grid and a transparent electrically-conductive layer, the metal grid being shielded by the black matrix.

12. The display panel according to claim 10, wherein the black matrix, the touch sensor and the color filter layer are disposed in sequential order on a surface of the first transparent substrate facing the liquid crystal layer.

13. The display panel according to claim 10, wherein the first substrate further comprises common electrodes on a surface of the color filter layer facing the liquid crystal layer.

14. A liquid crystal display, comprising an in-cell touch liquid crystal display panel, wherein the in-cell touch liquid crystal display panel comprises:
a first substrate and an array substrate disposed in opposition to each other, and
a liquid crystal layer disposed between the first substrate and the array substrate,
wherein the first substrate comprises:
a first transparent substrate;
a black matrix; a touch sensor; and
a color filter layer;
wherein the touch sensor comprises:
a plurality of drive electrodes and a plurality of sense electrodes intersecting each other and having mutual capacitances formed between them; wherein
a plurality of dummy electrodes is disposed in a remaining area other than an area occupied by the drive electrodes and the sense electrodes, each of the dummy electrodes being surrounded by either a plurality of drive electrodes or a plurality of sense electrodes, and the dummy electrodes are located in a same layer as the drive electrodes and the sense electrodes;
a plurality of first bridges and a plurality of second bridges located in a same layer, wherein the plurality of dummy electrodes are electrically connected by the plurality of second bridges; and
wherein the plurality of drive electrodes separates each of the sense electrodes into a plurality of segments, the plurality of segments of a same sense electrode being electrically connected by the plurality of first bridges, the first bridges being insulated from the drive electrodes through an insulation layer, and the second bridges being insulated from the drive electrodes through the insulation layer; or
the plurality of sense electrodes separates each of the drive electrodes into a plurality of segments, the plurality of segments of a same drive electrode being electrically connected by the plurality of first bridges, the first bridges being insulated from the sense electrodes through an insulation layer, and the second bridges being insulated from the sense electrodes through the insulation layer.

* * * * *